United States Patent
Rosenthal

Patent Number: 5,964,844
Date of Patent: Oct. 12, 1999

[54] METHOD AND APPARATUS FOR EXTENSIBLE COMMAND STRUCTURE FOR MACHINE VISION SYSTEM

[75] Inventor: Steven Rosenthal, Cambridge, Mass.

[73] Assignee: Cognex Corporation, Natick, Mass.

[21] Appl. No.: 08/819,457

[22] Filed: Mar. 17, 1997

Related U.S. Application Data

[63] Continuation of application No. 08/585,384, Jan. 11, 1996, abandoned, which is a continuation of application No. 08/182,613, Jan. 18, 1994, abandoned.

[51] Int. Cl.⁶ .............................. G06F 15/163; G06F 9/00
[52] U.S. Cl. ......................... 709/300; 709/303; 709/304
[58] Field of Search .................................. 395/670, 500, 395/677, 684, 685, 683; 709/300, 303, 302, 304, 305, 100

[56] References Cited

U.S. PATENT DOCUMENTS

| | | | |
|---|---|---|---|
| 4,730,258 | 3/1988 | Takeda et al. ............................ | 364/513 |
| 5,187,787 | 2/1993 | Skeen et al. ............................. | 395/600 |
| 5,280,610 | 1/1994 | Travis, Jr. et al. ...................... | 395/600 |
| 5,291,583 | 3/1994 | Bapat ....................................... | 395/500 |
| 5,297,279 | 3/1994 | Bannon et al. ........................... | 395/600 |
| 5,481,712 | 1/1996 | Silver et al. .............................. | 395/700 |

OTHER PUBLICATIONS

Bowskill et al. "An Object Oriented Approach to a Machine Vision Framework," Jan. 10, 1994, pp. 6/1–6/3.
Mundy et al, "An Object Oriented Approach to Template Guided Visual Inspection". Jun. 1992, pp. 386–392.
Copien Advanced C++ Programming Styles & Idiums, Pub. by Addison–Wesley, @1992 pp. 288–293.
Minneor et al Integrating The Sun Microsystem XDR/RPC protocols into the C++ Strean model; Paper at Using C++ Conference, Portland, OR, Aug. 10–13, 1992, pp. 295–300.

*Primary Examiner*—Zarni Maung
*Attorney, Agent, or Firm*—Maureen Stretch

[57] ABSTRACT

A method and apparatus for creating a unified command structure for machine vision systems by defining a command class for each action capable of being executed in the machine vision system; establishing a data translator object for parameter data used by each command; associating each command class with an execution member corresponding to each action; associating a command class with a data member corresponding to the parameter data; and pre-instantiating a command object corresponding to the command class; at runtime, and upon receipt of a command identifier, the present invention locates the command object corresponding to the command identifier; associates the data translator object with actual parameter data; causes the object to establish the object's data members; and calls the object's execution member function to perform such actions as are indicated by its command class definition.

14 Claims, 4 Drawing Sheets

METHOD AND APPARATUS FOR EXTENSIBLE COMMAND STRUCTURE FOR MACHINE VISION SYSTEM

This is a continuation of U.S. patent application Ser. No. 08/585,384, filed on Jan. 11, 1996, now abn.; which is a continuation of U.S. application Ser. No. 08/182,613, filed on Jan. 18, 1994, now abn.

BACKGROUND OF THE INVENTION

A. Field of the Invention.

This invention relates to machine vision, and more particularly, to methods and apparatus for creating a command framework for a machine vision system.

B. Background of the Invention.

In machine vision applications, a vision processor communicates with a host controller, computer, or other processor to automate such tasks as surface mounting of semiconductor devices. The communication between the two devices typically is in the form of commands the vision system is to perform and responses from the vision system regarding the results. The manufacturer of the vision processor usually defines a set of such commands that are included with the system. Commands might be defined for such functions as: acquiring an image; obtaining a frame buffer; inspecting the image in the frame buffer; displaying the results; and freeing the frame buffer.

Users of vision processing systems often need to customize or modify the vision processing features and may also develop new features for which new commands must be created. It may also be case that the vision processor may have several formats for such commands, for example, one format for commands received from the host controller, and a separate text-based command line interface for debugging purposes at the vision processor.

When a new command is added to the vision processor, a mapping between the command and the corresponding code invoked by that command in the vision processor is done, by the vision processor. One method of implementing this involves incorporating into the vision processor system a routine containing a series of if statements to do the mapping. In this approach, the mapping routine asks if the command is equal to a first command, and if not, a check is made for the next command, and so on, until a match is found. Each new command requires that the code in the mapping program be updated, recompiled, and re-linked into the vision processor in order to receive and handle a command from the host controller. Another approach uses a master lookup table which is indexed by the command name or command identifier. However, the entries still need to be entered into the table, and the table recompiled and relinked into the vision processor. Both of these prior approaches require not only that the command be compiled and linked into the vision processor, but also the recompilation and linking of either the mapping routine or the master lookup table.

In the field of computer networking in which different processors communicate with each other, remote procedure calls have been used to address a partially analogous situation, when one processor wishes to cause code to be executed at another processor location. In such a scheme, a packet of information is sent between the processors. Typically, such a packet contains information about the procedures being called and data arguments to be used by it.

In one such remote procedure call system the remote call mechanism provides a compiler that generates code that runs on both a client processor and a server processor. To continue the analogy to vision systems, the server would resemble the vision processor and the client the host. In this approach, three functions are used: register rpc, which is run on the server side; call rpc, which is run on the client side; and service run, also run on the server side.

In this system, a program runs in the background on the server, and at its startup, this program calls register rpc for each remote procedure call implemented in that server. Thus if five procedures are to be registered, there has to be code executed prior to calling service run that makes five calls to the register rpc function, one for each register rpc. Using this technique for the host or client side, it is necessary to specify the identifier of the remote machine, the procedure to be called and any arguments that must be passed to it.

In this approach, the information about the commands is distributed in several places throughout the server program and must be maintained accordingly. The series of calls to the register rpc function must be maintained and initiated. In such a system, a separate initialization step must be undertaken before the new procedures can be invoked.

Arguments and parameters passed to such procedures typically will need to be translated from the network representation to the representation used by the procedure in the server and that used b y the client. In one approach used by Sun Microsystems, these arguments are translated into and out of a format known as XDR for transmission over the network. In this scheme, the remote procedure can be invoked only with data in the XDR format.

Improvements in the method of adding new procedures in such networking applications have been accomplished in object-oriented remote procedure call systems using global objects or static initialization techniques to insert new procedures. In these systems, a server process contains a table indexed by an object identifier, and each entry points to a primary copy of the procedure object. When a new primary copy of an object is created, the constructor calls a routine to register the object mapping.

Improvements in the methods of translating to and from the XDR protocol have been described in which the translation of, or decoding to and from, an XDR protocol includes the use of object-oriented techniques, such as integrating a virtual model of an object-oriented data stream into input and output stream classes to format to an XDR protocol.

Exemplars and autonomous generic exemplars are other object-oriented design techniques known in the art which are also known to be applicable to creating a particular kind of object as selected by data.

SUMMARY OF THE INVENTION

A method for creating a unified command structure for machine vision systems by defining a command class for each action capable of being executed in the machine vision system; establishing a data translator object for parameter data used by each command; associating each command class with an execution member corresponding to each action; associating a command class with a data member corresponding to the parameter data; and pre-instantiating a command object corresponding to the command class.

At runtime, upon receipt of a command identifier, the present invention locates the command object corresponding to the command identifier; associates the data translator object with actual parameter data; causes the object to establish the object's data members; and calls the object's execution member function to perform such actions as are indicated by its command class definition.

It is a feature of the present invention that a host computer can transmit command objects (possibly containing argument data) to be executed in a vision processor and that a vision processor can transmit response objects (possibly containing argument data) to the host controller.

In a preferred embodiment of the present invention users of a machine vision system can add new commands, responses, protocols, data representations, and link layer implementations easily. A preferred embodiment permits this to be done in a way that also minimizes the need to maintain code located in several different places in the system.

In a preferred embodiment of the present invention an additional command-line interface gives interactive access to all available commands over a serial line.

It is a further feature of the invention that a transcript of all received commands (and/or all transmitted responses) can be generated at the debugging interface.

It is another feature of the present invention that a host controller can mark a command as "normal" or "priority". Execution of priority commands will preempt execution of normal commands.

Still another feature of the invention stems from the fact that link data representation (byte ordering, etc.) does not depend on the vision processor or the host computer's processor. Tools are provided to automate the conversion of command/response data to/from the link data representation.

Another aspect of the invention is that it can support several kinds of physical link: VME, PC bus, RS-232, and others. A preferred embodiment implements a VME link layer.

DETAILED DESCRIPTION OF THE INVENTION

Figure 1:
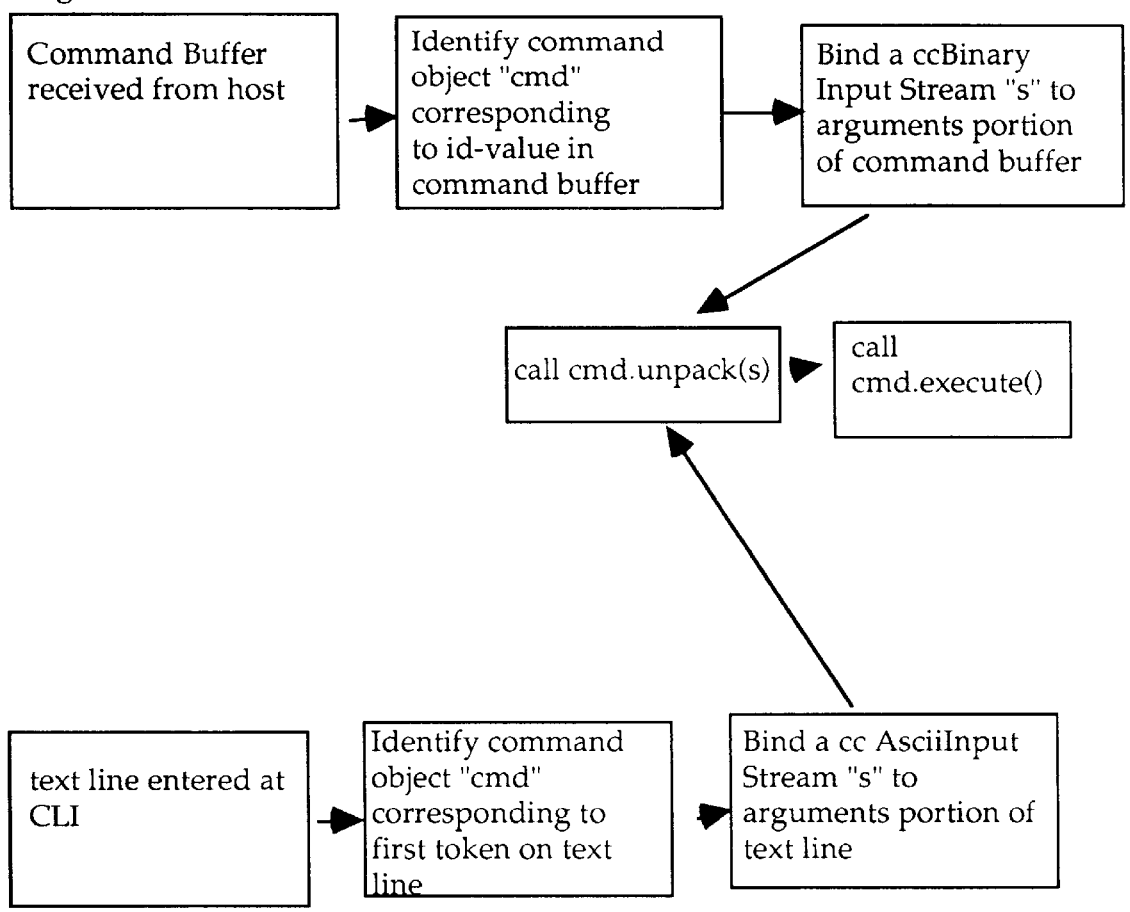
FIG. 1 is a schematic diagram of the present invention.

Turning to FIG. 1, the path for invocation of command according to the present invention is shown. For commands coming from the host controller, a command buffer is received from the host controller, the present invention identifies the command object which corresponds to the command identifier value contained in the command buffer. Next, a virtual object ccBinaryInput Stream is bound to the arguments portion of the command buffer. According to the method and apparatus of the present invention, a command unpack function is called and the command is executed.

Also in FIG. 1, Ascii commands entered as text lines at a command line interface (CLI) in the vision processor are processed by the same method and apparatus. A command object is identified from the first token contained in the text line, an asciiInputStream virtual object is bound to the arguments portion of the text line, the unpack function is executed, and the command execute function is called.

For each command in FIG. 1, a command object is created, an unpack function is called, and unpack extracts the command's argument data from the input stream, which obtains the data from either binary formatted data or ASCII formatted text. The command's execute( ) function is called and does whatever is appropriate for its command class, using the command object's data member or arguments.

In a preferred embodiment of the present invention, the command class for command objects depicted in FIG. 1 is derived from a common base class, overrides an execute( ) virtual function, overrides an unpack (ccInputStream &) virtual function and contains data members representing command's arguments and parameters.

Figure 2:
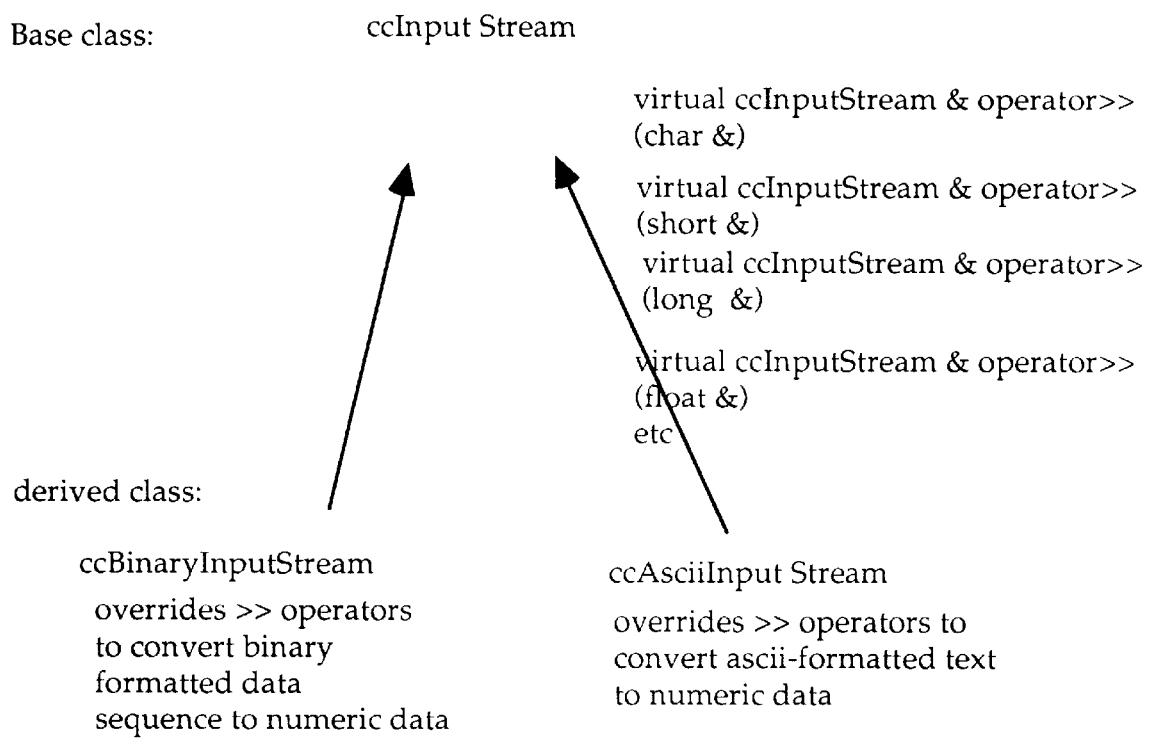
FIG. 2 is an illustration of the construction of a data translator object according to the present invention.

Turning to FIG. 2, a data translator object is depicted. Here a base class, for the data translator object is defined as ccInput Stream and is shown with two derived classes, ccBinaryInputStream and ccAsciiInput Stream. Turning to the base class, it can be seen that a number of virtual operators are shown depicting various types of data, such as character, short integer, long integer, floating point integer, and so on. A derived class, such as ccBinaryInput Stream will override the virtual operators in the base class ccinput Stream with its own operators, which, in the case depicted would convert binary formatted data to numeric data.

Figure 3:
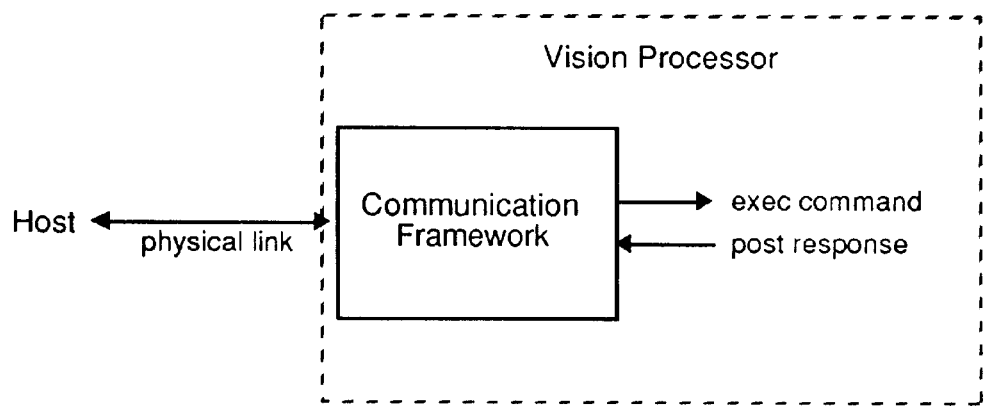
FIG. 3 is a block diagram of a machine vision system incorporating the present invention.

Turning now to FIG. 3, it can be seen that the present invention provides means by which commands are received by a vision processor over a physical link from a Host, Within the vision processor, the commands are handled by a communication framework. Commands are executed by the vision processor and responses generated by the vision processor are sent back to the Host.

The invention also provides a command-line interface debugging capability for interactively exercising commands and responses.

Still in FIG. 3, the host computer communicates with the vision processor over a single physical link, sending commands to the vision processor and receiving responses from the vision processor. The physical link can take one of several forms: a VME back plane, RS-232 serial line, and so on. The extensible command framework of the present invention provides the means by which the vision processor executes commands and generates responses, and shields the application from details of the physical realization of the communication link.

In a preferred embodiment of the invention, commands are executed either asynchronously by a software interrupt or synchronously by polling, as selected by the host on a per-command basis. Responses are usually generated by commands, and can also be posted asynchronously or synchronously.

Figure 4:
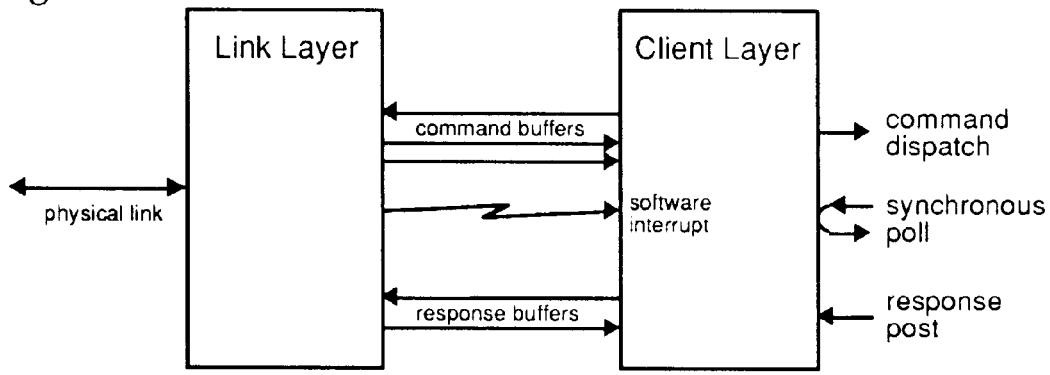
FIG. 4 depicts two programming layers of the present invention, a link layer and a client layer.

The extensible command framework of the present invention is divided into two major layers as shown in FIG. 4. By partitioning the communication framework in this fashion, the client layer code, which is the bulk of the communication framework, and the application code in the vision processor become independent of the physical link. In addition, all operating system dependencies of the communication framework are buried in the link layer.

Still in FIG. 4, the link layer is responsible for transporting command buffers to the vision processor from the host, and transporting response buffers from the vision processor to the host. A command or response buffer is an encoded representation of a command or response object. There are two components to any link layer implementation: the portion running in the vision processor, and the portion running in the host computer. In the vision processor, the link layer provides services to the client layer; in the host computer, the link layer provides services to application routines or tasks that want to send commands and/or receive responses.

The link layer provides the following services to its clients:

sequencing: if two command buffers are submitted to the link layer for transmission to the vision processor, the two buffers will arrive at the vision processor in the order in which they were sent. The same is true for response buffers.

reliability: if the physical link is not totally reliable, then the link layer will implement an appropriate error detection/recovery scheme. This service is invisible to the link layer clients.

flow control. The link layer guarantees that a command will not be transmitted to the vision processor if the vision processor is not able to receive it (no available command buffer). Similarly, the link layer guarantees that a response will not be sent to the host computer if the host is not able to receive it.

Different implementations of the link layer can be developed to support various physical communication link types between the host and the vision processor. For instance, VME back plane, serial port and PC bus or CPI bus are all possible interconnect schemes. The link layer presents a uniform interface to the client layer, so regardless of what kind of physical link (and corresponding link layer implementation) is being used, the bulk of the communication framework code and the application code is unchanged.

Figure 5:
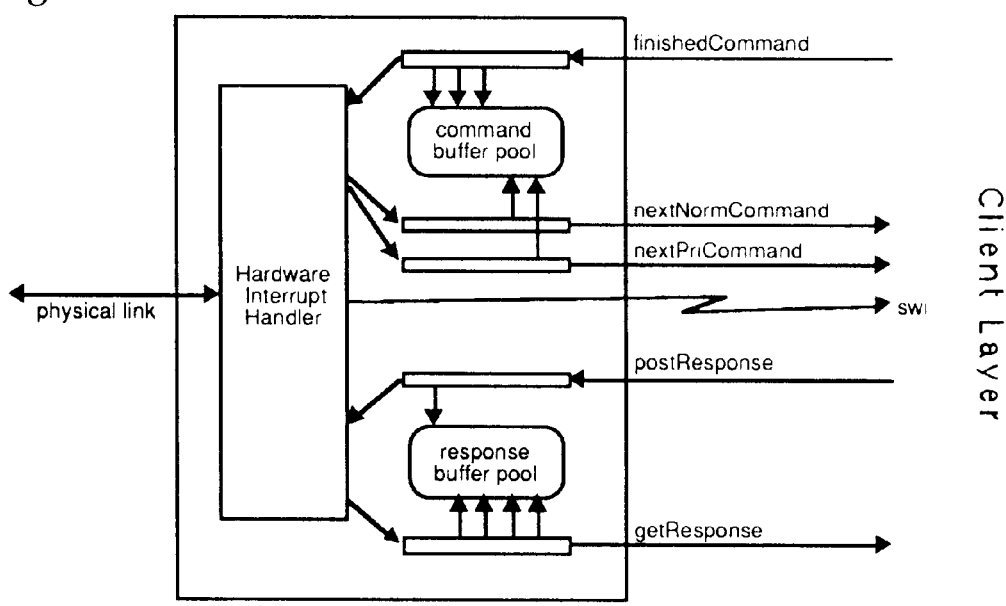
FIG. 5 depicts a flow of commands through the system according to the present invention.
Figure 6:
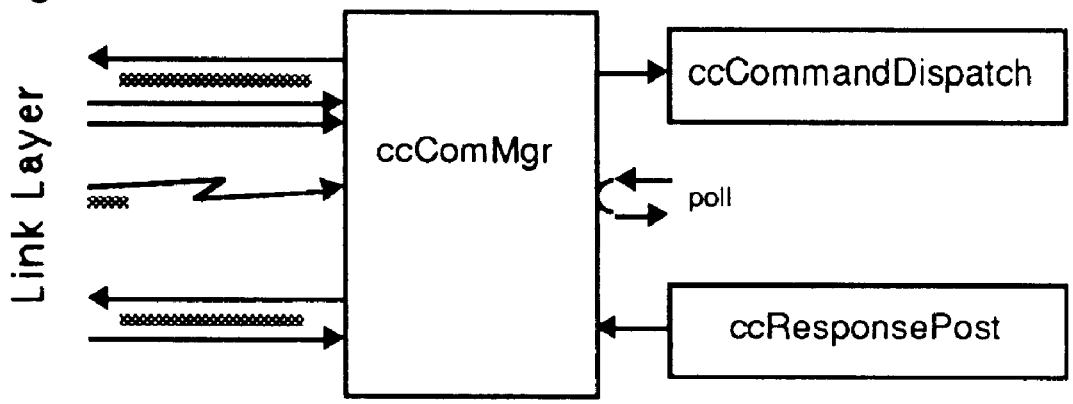
FIG. 6 illustrates command dispatching.

The link layer contains a pool of command buffers and a pool of response buffers. Each buffer pool has associated cfifo structures used to store buffer pointers. In FIG. 5, the command buffer pool's bottom two cfifos (first-in-first out queues) hold pointers to newly received command buffers (normal and priority), and the top cfifo holds pointers to free command buffers available to receive new commands. The response buffer pool's top cfifo holds pointers to response buffers awaiting transmission, and the bottom cfifo holds pointers to free response buffers available for posting future client responses.

According to the method and apparatus of the present invention, the client layer interfaces to the link layer, receiving command buffers from the link layer, converting the command buffers to command objects and then executing them. In addition, the client layer accepts response objects from the application, converting them to response buffers and giving them to the link layer for transmission.

From a machine vision application's point of view, command s are executed as they arrive at the vision processor. An application, such as surface mounting of devices, does not explicitly obtain the next command from a queue and interpret it within the application code. Instead, the communication framework client layer is activated via a software interrupt, for priority commands, or via a polling call from the application, for normal commands; whenever the client layer is activated, it checks the link layer to see if any command buffers are available to be processed.

Figure 7:
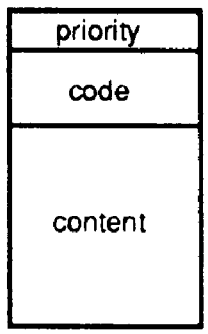
FIG. 7 depicts a command buffer according to the present invention.

In the communication framework link layer, a command buffer is a sequence of bytes representing a particular command to be executed by the communication framework client layer. The format of a command buffer is shown in FIG. 7. The first two items of a command buffer are a fixed-format header. The first header item is a flag whose value indicates whether the command is normal (=0) or priority (=1). The next header item is a four byte long integer, that uniquely identifies the type of command encoded in the command buffer. Following the header is a sequence of bytes, the command "content," which is the encoded representation of the arguments of the command. The length, format, and meaning of the content portion of a command buffer can be different for each type of command.

At the interface between the link layer and the client layer, a ccCommandBuf struct is used to represent a command buffer. The ccCommandBuf struct contains fields representing the command buffer's priority, command code, and content. In addition, the ccCommandBuf contains a length field, which specifies how many bytes are contained in the content field. The command buffer format in FIG. 7 does not include the length; the length must somehow be communicated by the link layer along with the buffer contents. How this is done depends on the link layer implementation.

The communication framework client layer of the present invention uses an object-oriented model for commands. In this view, a command object is an instance of a class derived from ccCommand. The ccCommand abstract base class provides, among other things, an _execute( ) virtual function that is overridden in each command derivation to do whatever action is appropriate for that type of command. In addition, a command derivation will typically add member data representing the arguments for that type of command.

One of the central tasks performed by the communication framework client layer is to "dispatch" or locate command buffers received from the link layer. Dispatch operations are initiated either via software interrupt, for priority commands, or via a poll operation, for normal commands. Dispatching a command buffer involves the following steps depicted in FIG. 1:

1. Obtain an instance of the ccCommand subclass corresponding to the code value contained in the command buffer.
2. Initialize the derived ccCommand object's data members according to the command buffer's content.
3. Filter and execute the initialized derived cccommand object.
4. Give the command buffer back to the link layer for reuse.

The ccCommandDispatch module of the present invention performs the above steps as follows:

Step 1. is accomplished by use of a ccCommandRegistry (not shown). In a preferred embodiment of the present invention, the ccCommandRegistry is a hash table that maps a command code to a corresponding derived cccommand instance. Every derived ccCommand class defines a static or global instance of itself and adds that instance (called the "exemplar") with the corresponding command code to the ccCommandRegistry.

Step 2. includes "decoding" the command buffer's content. ccCommandDispatch accomplishes this by calling, indirectly, the derived cccommand object's unpacks virtual function, passing it a binary ccInputStream bound to the content field of the command buffer. The derived ccCommand class overrides unpack( ) with an implementation that performs the appropriate extraction (>>) operations to read values from the binary ccInputStream argument into the command object's data members.

Step 3. is accomplished by calling the _execute( ) virtual function on the decoded derived cccommand object. However, this is preceded by a command filtering process. The ccCommandDispatch module maintains a list of ccCommandFilter callback objects, each of which is passed the about-to-be-executed command object. If any of the filters returns null, then the command is not executed.

This filtering step allows debugging facilities such as command tracing, where each command is printed before it is executed, and command rejection, where execution of selected commands is inhibited, to be implemented.

After a command object is executed, it is conceptually discarded. In a preferred embodiment of the present invention, step 1. in actuality returns the exemplar object itself, which is used directly in Step 2. This is more efficient than making and discarding a copy of the exemplar object each time.

The implementation efficiently handles reentrant use of the same command due to priority command execution.

In a preferred embodiment of the present invention, when deriving a derived class from the ccCommand abstract base class, the following pure virtual functions need to be overridden:

make( ): allocates a new command object of the same derived type as this;

canBe( ): returns an enum indicating allowable priorities for this command;

code( ): returns this command's code value;

name( ): returns this command's string name (for command line based command execution; )

_execute( ): implements whatever execution actions are appropriate for this kind of command;

usage( ): returns a string identifying this command's arguments (for command line based prompting; )

unpack( ): extracts this command's data member values from a ccInputStream argument.

pack( ): inserts this command's data member values to a ccOutputStream argument (for displaying a command during tracing;

In addition to overriding the above functions, a ccCommand derivation must also define a static exemplar object, initializing it using the protected cccommand constructor, passing the command code and name as arguments. This is so that the ccCommandRegistry will have an entry for each derived ccCommand type.

In a preferred embodiment of the present invention, it is not necessary to write out code for all of the above items whenever a cccommand derivation is defined. "Derivation macros" cmDerivedCommandDcl and cmDerivedCommandDef take care of all of the above items except for _execute( ), usage( ), unpack( ), and pack( ).

In a preferred embodiment of the present invention, few commands are derived directly from the ccCommand base class. Instead, an intermediate base class derived from ccCommand is typically used as the base for command derivation. The purpose of the intermediate base class is to implement protocols and policies that are common to an entire family of commands.

Turning again to FIG. 4, it can be seen that in the communication framework link layer, a response buffer is a sequence of bytes representing a particular response that was posted by the communication framework client layer for transmission to the host. The format of a response buffer is shown in FIG. 8.

Figure 8:
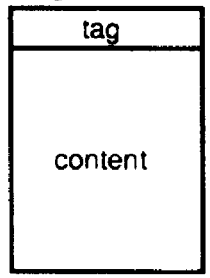
FIG. 8 depicts a response buffer according to the present invention.

In FIG. 8, the first item of a response buffer is a fixed-format header. It is a single byte whose value helps identify the response. Some tag values uniquely identify a single kind of response object; other tag values identify a group of response types. In the latter case, part of the response buffer content typically further identifies the particular response type within the group of response types identified by the tag.

Following the header is a sequence of bytes, the response "content," which is the encoded representation of the data of the response. The length, format, and meaning of the content portion of a response buffer can be different for each type of response.

At the interface between the link layer and the client layer, a ccResponseBuf struct is used to represent a response buffer. The ccResponseBuf struct contains fields representing the response buffer's tag and content. In addition, the ccResponseBuf contains a length field, which specifies how many bytes are contained in the content field. Note that the response buffer format in FIG. 8 does not include the length; the length is communicated by the link layer along with the buffer contents. How this is done depends on the link layer implementation.

1.6.2 Client Layer

The CF client layer uses an object-oriented model for responses. In this view, a response object is an instance of a class derived from ccResponse. A response derivation will typically add member variables representing the data for that type of response.

The process of requesting that a response object be sent to the host is called "posting" the response. Although responses are usually posted from a command's _execute( ) function, responses can be posted from any portion of the application, executing either synchronously or from within a software interrupt.

A client posts a response by obtaining an instance of the desired ccResponse subclass. This can be either via the new operator, or via the instance( ) static member function of the desired ccResponse subclass. Using instance( ) is more efficient, since it reuses the existing response exemplar object, rather than making a new response object every time. (The implementation of instance( ) efficiently handles reentrant use of the same response in synchronous and asynchronous code, by means beyond the scope of this document.)

After obtaining an object of the desired ccResponse subclass, the client initializes its data members, and uses the post( ) function of the ccResponsePost module of FIG. 4 to cause the response to be posted.

Posting a response object involves the following steps:
1. Filter the posted response object.
2. Obtain a free response buffer from the link layer.
3. Write the response object's data member values into the response buffer.
4. Give the response buffer to the link layer for transmission to the host.

Step 1. implements a filtering process similar to that for commands. This filtering step allows debugging facilities such as response tracing (each response is logged before it is transmitted to the host) and response rejection (certain kinds of response are recognized and selectively suppressed) to be implemented.

Step 3. is called "encoding" the response buffer's content. This is accomplished by calling (indirectly—see xmitable.H) the derived ccresponse object's pack( ) virtual function, passing it a ccOutputStream bound to the empty content field of the response buffer. The derived ccResponse class overrides pack( ) with an implementation that performs the appropriate insertion (<<) operations to write the response object's data member values to the ccOutputStream argument. See response.H for a sample pack( ) implementation.

When deriving from the ccresponse abstract base class, the following pure virtual functions need to be overridden:

make( ): allocates a new response object of the same derived type as this;

tag( ): returns this response's tag value;

name( ): returns this response's string name,for command line based response posting;

usage( ): returns a string identifying this response's data, for command line based prompting;

unpack( ): extracts this response's data member values from a ccInputStream argument for generating a response from the command line interface;

pack( ): inserts this response's data member values to a ccOutputStream argument.

In addition to overriding the above functions, a ccResponse derivation also defines a static exemplar object, initializing it using the protected ccResponse constructor, passing the response tag and name as arguments. This is so that the ccResponseRegistry will have an entry for each derived ccResponse type, allowing generation of a response from the command line interface, and supporting host-based response recognition.

Finally, a ccResponse derivation provides an instance( ) static member function, and any non-default constructors that may be desired.

In a preferred embodiment of the present invention, derivation macros cmDerivedResponseDcl and cmDerivedResponseDef take care of all of the above items except for usage( ), unpack( ), pack( ), and non-default constructors. An illustrative ccResponse derivation is given in response.H.

In a preferred embodiment of the present invention, few responses are derived directly from the ccresponse base class. Instead, an intermediate base class derived from ccresponse is typically used as the base for response derivation. The purpose of the intermediate base class is to implement protocols and policies that are common to an entire family of responses.

In the communication framework according to the method and apparatus of the present invention, a protocol is a set of rules and implementation mechanisms that constrain the behavior of commands and responses in a useful fashion. Because various users' host computers may have differing sensibilities with respect to command and response behavior, a flexible approach to protocol is desired in the communication framework.

Thus, the base architecture of the communication framework is largely policy free with regard to the behavior of commands and responses, while allowing users to define and implement various possible protocols.

In a preferred embodiment of the present invention, intermediate base classes, derived from ccCommand and ccResponse, can implement useful protocols in a convenient fashion.

For example, some protocol issues include such items as:

response policy. Should all commands generate a response? I sequence number. For efficiency, host software may want to issue several commands without waiting for each command's response. In such situations, it is convenient to label each command with a sequence number, and arrange for a command's response (if any) to be labelled with the same sequence number.

CLI flag. As an implementation detail relating to the command line interface debugging capability (see Section 1.8.1), command and response objects all have a CLI flag defined in the ccCommand and ccResponse base classes. If a command posts a response, it is required to set the response object's CLI flag to match that of the command.

error handling. If a command's unpack( ) or _execute( ) function throws an error, the communication framework propagates that error to the poll( ) operation that caused the command to be dispatched (if an error occurs during a priority command, the error is saved and is rethrown at the next poll( ) call).

Some applications might want an error during a command's unpack( ) or _execute( ) to result in an error response to be posted. Such a strategy fits in particularly well with protocols that require each command to generate a response.

Of course, it is possible to establish any of the above aspects of a protocol by convention, that is, simply requiring commands' _execute( ) override to implement certain desired policies. The problem with such an approach is that there is no way to guarantee that every commands' _execute( ) function properly implements the protocol, and any change to the protocol would require a change to all commands' _execute( ) function.

A better solution is to derive intermediate base classes from ccCommand and ccResponse. In a preferred embodiment of the present invention all actual command and response classes would be derived from the intermediate base classes. In this preferred embodiment, because the intermediate base classes implement the protocol all commands and responses derived from them automatically inherit the protocol.

It is an aspect of the present invention that the communication framework contains a Command Line Interpreter (CLI) that provides interactive access to all commands in the ccCommandRegistry. The CLI is activated from the application by periodically calling a poll function; as long as this is done, the CLI runs concurrently with communication framework processing of commands from the link.

The CLI typically performs its I/O on the serial line where a prompt appears. Instead of a system prompt, the CLI prints its own prompt, such as "smd3>" or "sapp>". When the user types a command string into the CLI and hits return, the CLI implementation does the following:

1. The first token of the input string is extracted. This is treated as the command name. The remainder of the input string is called the command tail.

2. The ccCommandRegistry is used to lookup the derived ccCommand exemplar object whose string name matches the command name found in step 1. In a preferred embodiment of the present invention, the ccCommandRegistry stores commands indexed both by name and by command code.

3. The command object's data members are initialized according to the command tail of the input string.

4. The command object's CLI flag is set.

5. The initialized command exemplar object is filtered and executed in the usual fashion.

Step 3. is called "parsing" the command tail. This is accomplished by calling the derived ccCommand object's unpack( ) virtual function, passing it an ASCII ccInputStream bound to the command tail of the CLI input string. The unpack( ) implementation performs the appropriate extraction (>>) operations to read values from the ASCII ccInputStream argument into the command object's data members.

In a preferred embodiment of the present invention, this step is very similar to the "decode" step of dispatching a command buffer received from the link layer. In a preferred embodiment of the present invention, both the "decode" and the "parse" operations are accomplished by the same unpack( ) routine. The difference is that in the "decode" case, unpack( ) is passed a binary ccInputStream, and in the "parse" case, unpack( ) is passed an ASCII ccInputStream.

Thus, without needing any per-command CLI parsing code, all commands can be invoked from the command line. Each command provides its own parsing logic, via unpack( )'s extraction of data from an ASCII ccInputStream.

If a command invoked from the CLI posts a response, that response is displayed at the CLI and is not sent to the host. This is accomplished with the aid of a CLI flag in the ccCommand and ccResponse base classes. When a command is invoked from the CLI, the corresponding command object's CLI flag is set (Step 4. above). Whenever any command posts a response, it must arrange for the response object's CLI flag to be set to the same state as the posting command's CLI flag.

At startup, the CLI installs a response filter that examines all posted responses. If the CLI response filter sees a response with its CLI flag set, it prints the response to the CLI's output channel, and prevents that response from being transmitted to the host. Responses with the CLI flag clear are not printed, and are allowed to continue toward being transmitted to the host.

In addition to processing commands, the CLI also provides csh-style conveniences such as alias substitution, variable substitution, and a command history list. This is accomplished by means of Command Line Preprocessors (CLP). The CLI allows CLP objects to be plugged into the CLI. When a string is typed into the CLI, it is passed through all CLPs before being processed as a command. When a CLP is passed an input string, it may return either the same string, a replacement string, or null. If null is returned, then no further command line processing is performed; otherwise, processing continues with the returned, perhaps altered, string.

The communication framework supports command and response tracing, which allows commands received from the host, and vision processor responses sent to the host, to be displayed as they occur. The trace facility is controlled by commands entered at the CLI.

In a preferred embodiment of the present invention, tracing uses two aspects of the communication framework architecture: command and response filtering, and the ability to "unparse" a command or response object (via the pack( ) virtual function—see xmitable.H) into a form suitable for printing.

A few standard commands are supplied with the communication framework to allow the link layer to be exercised in a simple fashion. One such command is a simple "nop" command that does nothing once received in the vision processor; another such command is a simple "echo" command that simply generates a standard response.

The third such command is a "generate response" command whose argument data is a string that is interpreted as the name and argument data of a response. The ccResponseRegistry is used to locate the exemplar object for that response, which is initialized from the "generate response" command's argument string. The response is then transmitted to the host. Thus, the "generate response" command allows any response to be sent to the host.

In addition to the standard link exercising commands described above, most link layers will supply one or more commands to allow CLI-based access to the internal state of that link layer. The VME link layer includes such link layer debugging commands.

Defining a machine vision application's set of commands and responses is the primary manner in which a user extends the communication framework. Accordingly, the present invention simplifies the task of defining commands and responses. For example, much of the tedium of writing class derivations from ccCommand and ccResponse (or from intermediate base classes) is relieved by use of macros that supply much of the "boilerplate" for these derivations.

By using a polymorphic ccInputStream and ccOutputStream abstraction, the communication framework allows a single pair of pack( ) and unpack( ) functions to be used for both binary data translation and also ASCII data translation. It would be apparent to one skilled in the art that other translations could be effected using a single pair of unpack functions.

In a preferred embodiment of the present invention, each added command class inserts its own exemplar object into the ccCommandRegistry at startup time. There is no need to edit a central switch statement or table definition when adding commands or responses.

In a preferred embodiment, each added command is automatically available for testing through the CLI.

As can be seen, the present invention is policy-free with regard to command/response protocol issues. Instead, the communication framework of the present invention allows protocols to be defined and implemented by the client via intermediate base classes derived from ccCommand and ccResponse.

The communication framework according to the method and apparatus of the present invention detects many error conditions, but defers their handling to the user.

The communication framework of the present invention may be adapted to accommodate any kind of physical communication link, such as VME shared memory, PC bus, RS-232, etc. In a preferred embodiment of the present invention, most of the communication framework is independent of the details of the particular physical link being used, so adapting the communication framework to a new physical link is a well-contained task.

The ccLinkInterface abstract base class defines the logical connection between the client layer and the link layer; each kind of physical link has a corresponding derived ccLinkInterface implementation. The connection between the client layer and the link layer is achieved by "plugging in" the appropriate derived ccLinkInterface object into a ccComManager object.

The base communication framework according to the method and apparatus of the present invention provides two kinds of data translator objects using derived ccInputStream and ccOutputStream for converting command/response data to a serial representation: binary and ASCII. In a preferred embodiment, the binary implementation is used for encode/decode (for link data conversion), and the ASCII implementation is used for parse/unparse (for CLI data conversion).

A user may introduce a different representation for data by making new derivations from ccInputStream and ccOutputStream, implementing the insertion and extraction operators (<< and >>) to represent the various fundamental data types in whatever fashion is desired. The ccCommand and ccResponse classes define virtual functions that may be overridden (typically in intermediate command/response protocol base classes) to change what type of ccInputStream and ccOutputStream are used for encode/decode and parse/unparse.

Those skilled in the art will appreciate that the embodiments described above are illustrative only and that other systems in the spirit of the teachings herein fall within the scope of the invention. Thus, for example, it will be appreciated that methods and apparatus other than that described above for defining and deriving command objects can be used. Likewise, the use of object oriented design approaches other than those described above fall within the spirit and scope of the invention. Moreover, it will be appreciated that the method and apparatus described herein can be used to construct extensible communication frameworks for any of a number of machine vision applications.

Similarly, systems constructed in accord with the invention have applicability outside the field of surface mounting of semiconductor devices. These and other such uses, as well as modifications, additions and deletions to the techniques described herein may fall within the scope of the invention.

What is claimed is:

1. A method for creating and interactively testing a unified command structure for machine vision systems, comprising:
   a. defining a command class for each action capable of being executed in a vision processor;
   b. establishing a plurality of data translator objects for parameter data in each of the plurality of formats used by each said action without the need to create two separate sets of command classes;
   c. associating said command class with an execution member corresponding to each said action;
   d. associating said command class with a data member corresponding to said parameter data;
   e. pre-instantiating a command object corresponding to said command class;
   f. upon receipt of a command identifier and its input stream data, locating said command object corresponding to said command identifier;
   g. associating each of said data translator objects with input stream data in a particular format;
   h. causing said data translator's object to establish said command object's data members;
   i. calling said command object's execmtion member function to perform such actions as are indicated by its command class definition, thus permitting the insertion, execution, and interactive testing of new commands in a plurality of parameter data formats.

2. The method of claim 1, further comprising establishing a command class capable of handling invocations of one command identifier having parameter data defined as virtual functions that can be overridden to specify the format of data presented.

3. The method of claim 2, wherein said plurality of different formats include an ASCII format for interactive command line interface testing and a binary format for execution.

4. The method of claim 1, wherein establishing said command object's data members is accomplished using an unpack function that extracts the command object's parameter data from said command object's input stream data, using said data translator object associated with the particular parameter data format of said input stream data.

5. The method of claim 4, wherein said unpack function further comprises using said data translator object to convert said command identifier's input stream data into the appropriate format.

6. The method of claim 1, wherein pre-instantiation further comprises constructing said command object as a global object, so that a global object constructor causes an entry to be inserted into a master lookup table of commands to be used for dispatching objects without requiring the contents of said master lookup table of commands to be explicitly defined, thereby permitting new commands to be inserted, tested and executed without extensive recompiling.

7. The method of claim 1 wherein defining a command class further includes defining an intermediate command class to permit virtual functions to be overridden.

8. An apparatus for creating and interactively testing a unified command structure for machine vision systems, comprising:
   a. means for defining a command class for each action capable of being executed in a vision processor;
   b. means for establishing a plurality of data translator objects for parameter data in each of the plurality of formats used by each said action without the need to create two separate sets of command classes;
   c. means for associating said command class with an execution member corresponding to catch said action;
   d. means for associating said command class with a data member corresponding to said parameter data;
   e. means for pre-instantiating a command object corresponding to said command class;
   f. upon receipt of a command identifier and its input stream data, means for locating said command object corresponding to said command identifier;
   g. means for associating each of said data translator object with input stream data in a particular format;
   h. means for causing said data translator object to establish said command object's data members;
   i. means for calling said command object's execution member function to perform such actions as are indicated by its command class definition, thus permitting the insertion, execution, and interactive testing of new commands in a plurality of parameter data formats.

9. The apparatus of claim 8, further comprising means for establishing a command class capable of handling invocations of one command identifier having parameter data defined as virtual functions that can be overridden to specify the format of data presented.

10. The apparatus of claim 9, wherein said plurality of different formats include an ASCII format for interactive command line interface testing and a binary format for execution.

11. The apparatus of claim 8, wherein said means for establishing said command object's data members is accomplished using an unpack function means that extracts the command object's parameter data from said command object's in put stream data, using the data translator object associated with the particular parameter data format of said input stream data.

12. The apparatus of claim 11, wherein said unpack function means further comprises means for using said data translator to convert said command identifier's input stream data into the appropriate format.

13. The apparatus of claim 9, wherein said pre-instantiation means further comprises means for constructing said command object as a global object, so that a global object constructor causes an entry to be inserted into a master lookup table of commands to be used for dispatching objects without requiring the contents of said master lookup table of commands to be explicitly defined, thereby permitting new commands to be inserted, tested and executed without extensive recompiling.

14. The apparatus of claim 8 wherein said means for defining a command class further includes means for defining an intermediate command class to permit virtual functions to be overridden.

* * * * *